(12) United States Patent
Tsutsui (10) Patent No.: US 7,535,665 B2
(45) Date of Patent: May 19, 2009

(54) SERVO WRITER AND SERVO SIGNAL WRITING METHOD

(75) Inventor: Keiichi Tsutsui, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/700,026

(22) Filed: Jan. 31, 2007

(65) Prior Publication Data
US 2007/0177296 A1  Aug. 2, 2007

(30) Foreign Application Priority Data
Feb. 2, 2006  (JP) ............... 2006-026270

(51) Int. Cl.
*G11B 17/00* (2006.01)
*G11B 21/02* (2006.01)
*G11B 15/60* (2006.01)

(52) U.S. Cl. ............... 360/71; 360/90; 360/75; 360/241; 360/130.21

(58) Field of Classification Search ............... None
See application file for complete search history.

(56) References Cited

U.S. PATENT DOCUMENTS 5,827,599 A * 10/1998 Murao et al. ............... 428/141
6,970,312 B2   11/2005 Yip et al.
7,123,432 B2 * 10/2006 Komai ............... 360/75
2005/0099718 A1  5/2005 Takano et al.
2005/0105967 A2  5/2005 Nakao
2005/0168869 A1  8/2005 Dugas et al.
2005/0219734 A1 * 10/2005 Rothermel et al. ............ 360/75

FOREIGN PATENT DOCUMENTS

JP  2003-196810 A  7/2003
JP  2005-332460 A  12/2005

* cited by examiner

*Primary Examiner*—Andrew L Sniezek
(74) *Attorney, Agent, or Firm*—Sughrue Mion, PLLC

(57) ABSTRACT

A servo writer for writing a servo signal in a running tape memory medium comprises: a head which is arranged in a vicinity of a running path of the running tape memory medium; and a pair of guides which are disposed adjacent to the head in an upstream and downstream of the head in a tape running direction, wherein at least one of the head and pair of guides has a flange with which one edge the tape memory medium set in the running path runs is in contact, while the tape memory medium is running between the pair of guides, wherein the head has a sliding surface which slides in contact with a recording surface of the running tape memory medium, wherein the sliding surface is set with an inclination against a tape width direction of the tape memory medium, and the tape memory medium, which is running, is guided by the flange by having the one edge of the tape memory medium slide in contact with the flange.

13 Claims, 6 Drawing Sheets

SERVO WRITER AND SERVO SIGNAL WRITING METHOD

CROSS REFERENCE TO RELATED APPLICATIONS

This application claims the foreign priority benefit under Title 35, United States Code, §119(a)-(d) of Japanese Patent Application No. 2006-026270, filed on Feb. 2, 2006, the contents of which are hereby incorporated by reference.

BACKGROUND OF THE INVENTION

1. Field of the Invention

The present invention relates to a servo writer for writing a servo signal for a tracking control of a tape memory medium such as a magnetic tape and a servo signal writing method.

2. Description of Related Art

In recent years, a memory capacity of a magnetic tape for, for example, data backup of a computer has been increased. The memory capacity of the magnetic tape has been increased with an extended tape by thinning a magnetic layer and makes total thickness of the magnetic tape smaller. A servo signal is written in advance in the magnetic tape. In a memory reproducing apparatus, a data track can be traced (servo controlled) by controlling a position of a read/write head by reading out the servo signal. This is disclosed in, for example, a first to seventh patent literatures listed below.

- A first patent literature: claim 1, paragraphs 0013 to 0016, and FIG. 5 in Japanese Patent Laid-open Publication No. 2003-196810;
- A second patent literature: paragraphs 0020 to 0025 and FIG. 2 in Japanese Patent Laid-open Publication No. 2005-332460;
- A third patent literature: Specification of U.S. Pat. No. 6,970,312;
- A fourth patent literature: Specification of US Patent Laid-open Publication No. 2005/0099718;
- A fifth patent literature: Specification of US Patent Re-laid-open Publication No. 2005/0105967;
- A sixth patent literature: Specification of US Patent Laid-open Publication No. 2005/0168869;
- A seventh patent literature: Specification of US Patent Laid-open Publication No. 2005/0219734;

In a magnetic tape in which the aforementioned servo control is conducted, accurate writing of a servo signal is important. Especially, a writing position from a reference edge of the magnetic tape must be accurate. A servo writer has been known, which writes a servo signal in a magnetic tape by making one side edge of the magnetic tape as a reference edge, while adjusting a positional variation of the reference edge in a tape width direction (for example, refer to the first patent literature).

In the servo writer described in the first patent literature, a positional variation in a tape width direction of a magnetic tape is adjusted based on a position of a reference edge of the magnetic tape, which is detected in an upstream of a writing head for writing a servo signal. Specifically, by inclining and moving the writing head in the tape width direction in response to a positional variation of a detected reference edge, thereby changing a tension of a magnetic tape in the tape width direction, a running position of the magnetic tape is displaced. Through the adjustment of the running position as described above, a servo signal can be written in an accurate position.

In addition, a servo writer which suppresses a positional variation in a tape width direction of a magnetic tape has been known (for example, refer to the second patent literature). In the servo writer described in the second patent literature, the positional variation in the tape width direction is suppressed by holding one edge of the magnetic tape from above with a plurality of arms and by sliding the other edge in contact with a contact portion.

However, the servo writer described in the first patent literature is one which adjusts a running position of a magnetic tape when it detected a positional variation in a tape width direction, and it does not suppress the positional variation itself in the tape width direction.

In addition, in the servo writer described in the second patent literature, a positional variation in a tape width direction is suppressed by holding both edges of a magnetic tape from both sides. However, if this method is applied to a recent thin magnetic tape, the magnetic tape may be easily damaged. If damages are produced, a sliding condition of the edge for the contact portion becomes wrong. As a result, since a running position of the magnetic tape is easily deviated, a servo signal could not be written accurately in the magnetic tape. Accordingly, PES (Position Error Signal), which is a servo quality, has been degraded.

It is, therefore, an object of the present invention to provide a servo writer which can write a servo signal accurately in a tape memory medium by suppressing a positional variation in a tape width direction of the tape memory medium.

It is another object of the present invention to provide a writing method of the servo signal.

SUMMARY OF THE INVENTION

According to a first aspect of the present invention, there is provided a servo writer for writing a servo signal in a running tape memory medium, which comprises: a head which is arranged in a vicinity of a running path of the running tape memory medium; and a pair of guides which are disposed adjacent to the head in an upstream and downstream of the head in a tape running direction, wherein at least one of the head and pair of guides has a flange with which one edge the tape memory medium set in the running path runs is in contact, while the tape memory medium is running between the pair of guides, wherein the head has a sliding surface which slides in contact with a recording surface of the running tape memory medium, wherein the sliding surface is set with an inclination against a tape width direction of the tape memory medium, and the tape memory medium, which is running, is guided by the flange by having the one edge of the tape memory medium slide in contact with the flange.

In the first aspect of the present invention, when a tape memory medium runs along a guiding surface of a guide, the tape memory medium is shifted to a flange side due to an inclination of a writing head, and one edge of the tape memory medium slides in contact with the flange. With this method, a positional variation of the tape memory medium in a width direction is suppressed and a running position becomes stable. Therefore, a servo signal can be written accurately by a writing head. In addition, only one edge is in contact with the flange while the tape is sliding, which is different from that of the conventional technology. In the conventional technology, a tape is held with its both side edges. Therefore, the magnetic tape can be prevented from being damaged.

According to a second aspect of the present invention, there is provided a servo writer according to the first aspect, wherein the inclination of the sliding surface against the tape width direction is not more than 1 (one) degree.

In the second aspect of the present invention, the tape memory medium can be prevented from over-shifting to a flange side by setting the inclination of the writing head to be not more than 1 (one) degree. If the inclination is set to be more than 1 (one) degree, for example, wrinkles may be made on a surface of the tape memory medium, and a foreign object may be put between the wrinkles because the edge of the tape memory medium is strongly worn with the flange. On the contrary, according to the present invention, the tape memory medium can be prevented from these harmful effects.

According to a third aspect of the present invention, there is provided a servo signal writing method, which comprises steps of: a step for preparing a servo writer according to the first or second aspect; a step for setting a tape memory medium on the servo writer; and a step for writing a servo signal in the tape memory medium by the writing head, by running and sliding the tape memory medium in contact with the sliding surface of the writing head, while sliding the one edge of the tape memory medium in contact with the flange.

In the third aspect of the present invention, the tape memory medium is shifted to a flange side of a guide, and one edge of the tape memory medium slides in contact with the flange. Through the above, a positional variation of the tape memory medium is suppressed, and a running position becomes stable. Then, a servo signal can be written with a high accuracy by a writing head.

In addition, only one edge is in contact with the flange while the tape is sliding, which is different from that of the conventional technology. In the conventional technology, a tape is held with its both side edges. Therefore, an edge of the magnetic tape can be prevented from being damaged.

According to a fourth aspect of the present invention, there is provided a servo signal writing method according to the third aspect, wherein in the step for setting the tape memory medium, the tape memory medium is a magnetic tape which comprises a support and a magnetic layer formed on the support, and the support is projected to an end face of the magnetic tape more than the magnetic layer.

In the fourth aspect of the present invention, since an edge (one edge), where the support is projected to an end face of the magnetic tape more than the magnetic layer, slides in contact with a flange, the edge is prevented from being damaged. Meanwhile, a shape of the end face is formed in a cutting process when the magnetic tape is manufactured. The details will be described later.

According to a servo writer and servo signal writing method of the present invention, since a tape memory medium runs, while sliding an edge of the tape memory medium in contact with a flange, a positional variation of the tape memory medium in the tape width direction can be suppressed. Accordingly, a servo signal can be written with a high accuracy.

DETAILED DESCRIPTION OF THE PREFERRED EMBODIMENT

Figure 1A:
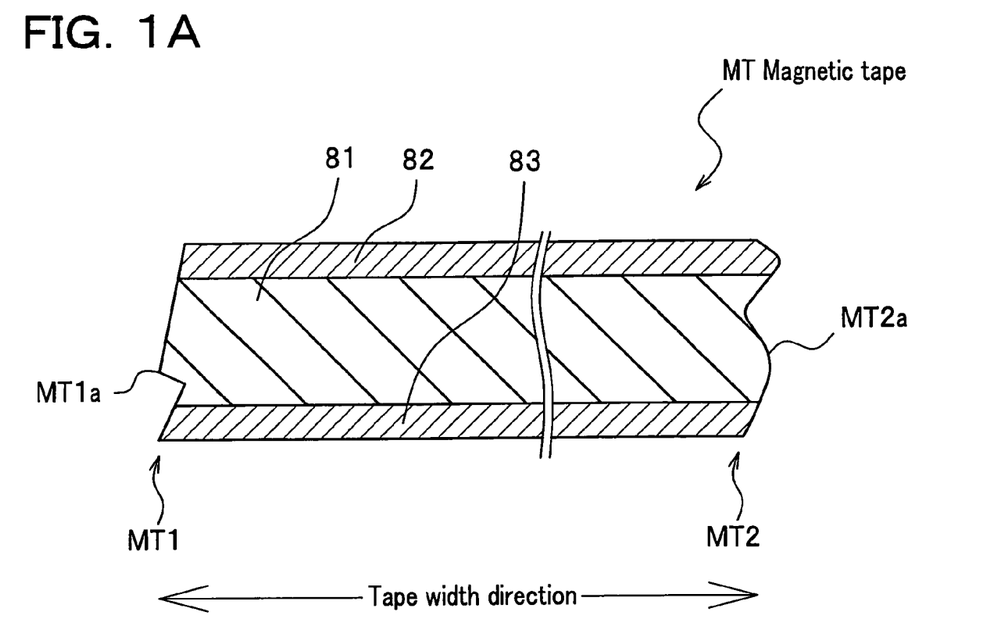
FIG. 1A is an enlarged view of a magnetic tape in a tape width direction.
Figure 1B:
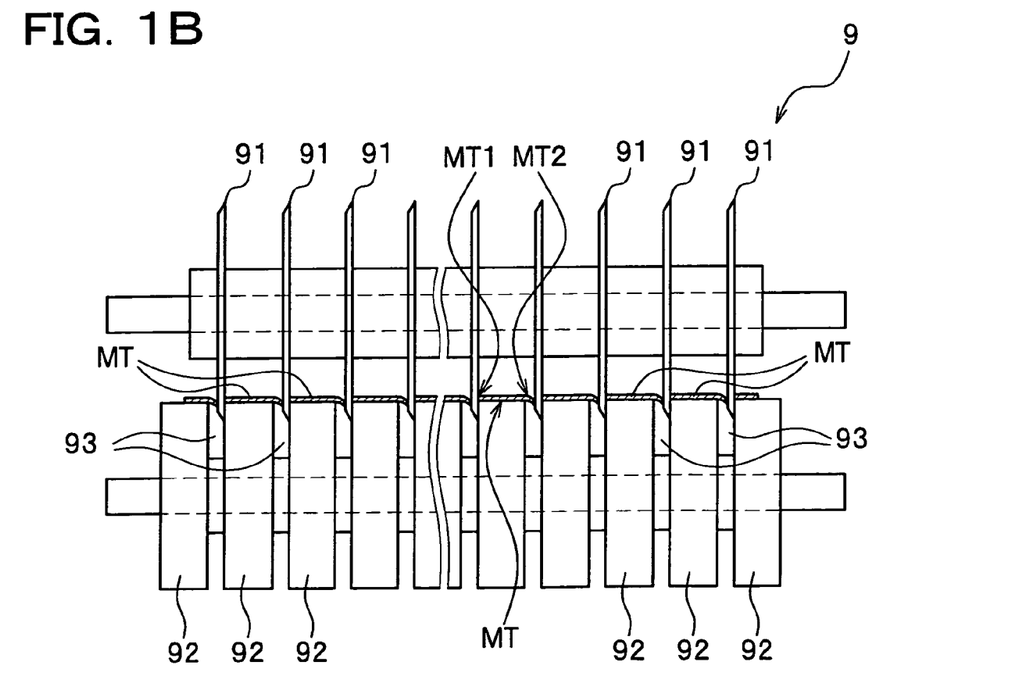
FIG. 1B is a schematic illustration showing a manufacturing status of a plurality of magnetic tapes by cutting an original magnetic tape into a predetermined width with a slitter unit.

Next, a preferred embodiment of the present invention will be explained in detail by referring to figures. FIG. 1A is an enlarged view of a magnetic tape in a tape width direction. FIG. 1B is a schematic illustration showing a manufacturing status of a plurality of magnetic tapes by cutting an original magnetic tape into a predetermined width with a slitter unit.

<Magnetic Tape>

First, a magnetic tape (a tape memory medium) on which a servo signal is written will be explained. As shown in FIG. 1A, the magnetic tape MT is a tape as thin as approximately 6.6 μm, and includes a non-magnetic support 81, a magnetic layer 82 which is formed on the support 81, and a back coat layer 83 which is formed on a back side of the support. The magnetic tape MT has edges MT1, MT2 at each edge of the tape in the tape width direction, and each of the edges MT1, MT2 has a different edge face to each other. On an edge face MT1a of the edge MT1 on the left side of the tape width direction, the magnetic layer 82 is formed in a projected-shape. On the other hand, the support 81 and back coat layer 83 are formed in a projected-shape on an edge face MT2a of the edge MT2 on the right side of the tape width direction. Meanwhile, the right and left directions of the magnetic tape explained in the embodiment are temporarily determined for descriptive purposes, and do not mean a specific direction.

A difference of shapes of the edge faces MT1a, MT2a at the edges MT1, MT2 of the magnetic tape MT is produced in a manufacturing process of the magnetic tape MT. The magnetic tape MT is manufactured from a wide original magnetic tape. As shown in FIG. 1B in more detail, a plurality of magnetic tape are manufactured by continuously passing a long and wide original magnetic tape though a slitter unit 9 which has a plurality of upper rotary blades and a plurality of lower rotary blades 92. In this case, because a side of the edge MT2 of the magnetic tape MT is cut being pushed by the upper rotary blades 91 into a concave portion 93 which is formed between adjacent lower rotary blades 92, the magnetic layer 82 on the upper side of the magnetic tape MT is pulled down, thereby resulting in formation of a projected-shape (so-called, "drooping" shape) of the magnetic layer 82. On the other hand, because a side of the edge MT1 of the magnetic tape MT, of which bottom surface is supported by the lower rotary blades 92, is cut by engaging the upper rotary blades 91 with the lower rotary blades 92, the support 81 and back coat layer 83 on the bottom surface of the magnetic tape MT, rather than the magnetic layer 82 on the upper surface, are formed in a projected-shape, contrary to the case of the edge MT2.

<Servo Writer>

Figure 2:
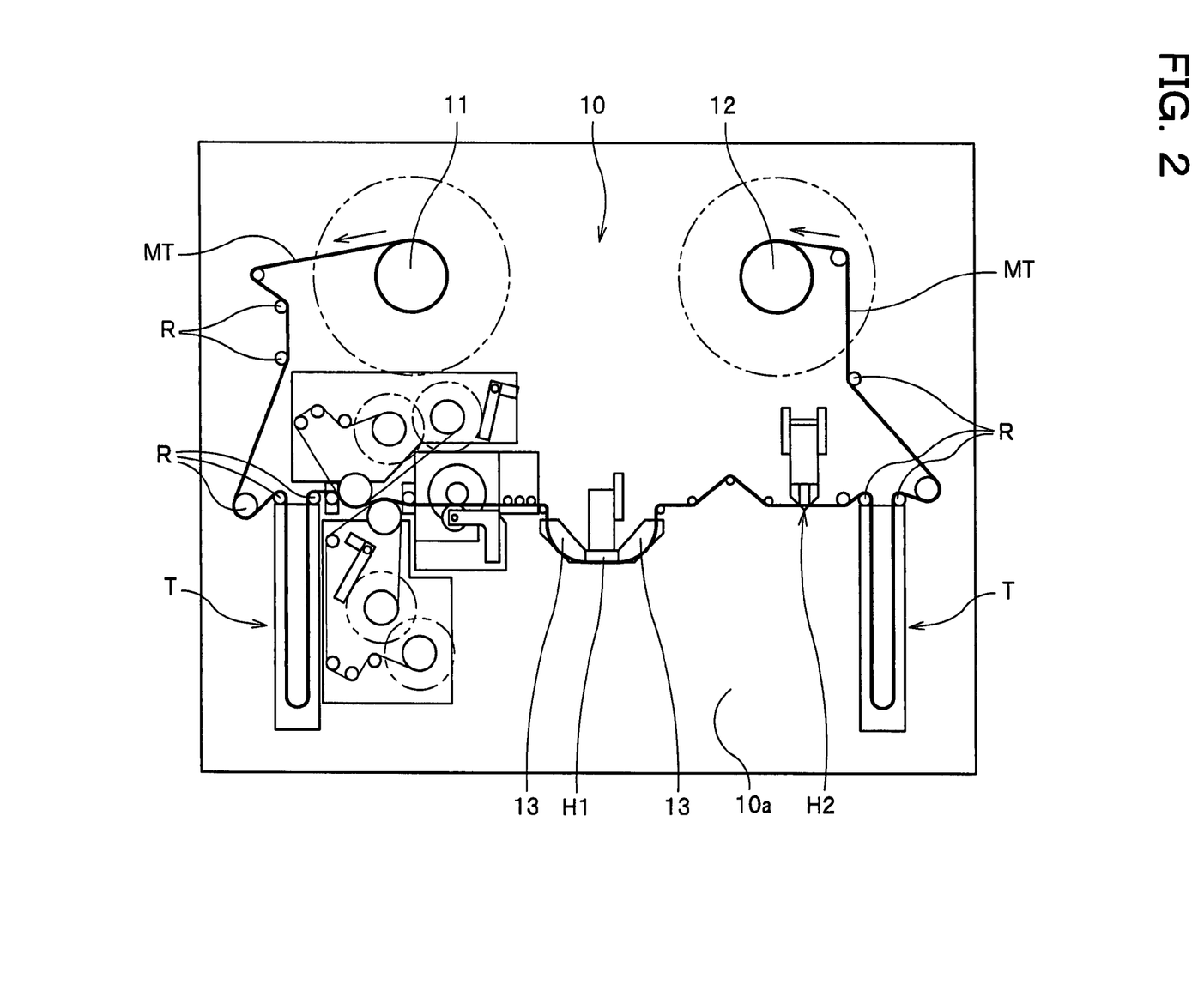
FIG. 2 is a servo writer configuration diagram according to an embodiment of the present invention.

Next, a servo writer which writes a servo signal in a manufactured magnetic tape MT will be explained. FIG. 2 is a servo writer configuration diagram according to the embodiment.

As shown in FIG. 2, a servo writer 10 includes a feeding reel 11 for feeding the magnetic tape MT and a winding reel 12 for winding the magnetic tape MT fed by the feeding reel 11. In a place on a downstream side of the feeding reel 11 and on an upstream side of the winding reel 12, a writing head H1 having a shape of, for example, "/\" for writing a servo signal is arranged. In addition, guides 13, 13 for running the magnetic tape MT along the writing head H1 are arranged both on the upstream side and downstream side of the writing head H1. Further, in a place between a guide 13 arranged in the downstream of the writing head H1 and the winding reel 12, a verifying head H2 for verifying a written servo signal by the writing head H1 is arranged. Meanwhile, the servo writer 10 includes a tension adjuster T for adjusting a tension of the magnetic tape MT to a predetermined tension, a tension detector (not shown), and other various devices such as guide rollers R for guiding the magnetic tape MT.

In the servo writer 10, the magnetic tape MT which is fed from the feeding reel 11 runs along a predetermined path due to rotations of capstan rollers, while guided by the guide rollers R, and wound by the winding reel 12, after recording a servo signal by the writing head H1 and reproducing the servo signal by the verifying head H2.

Figure 3:
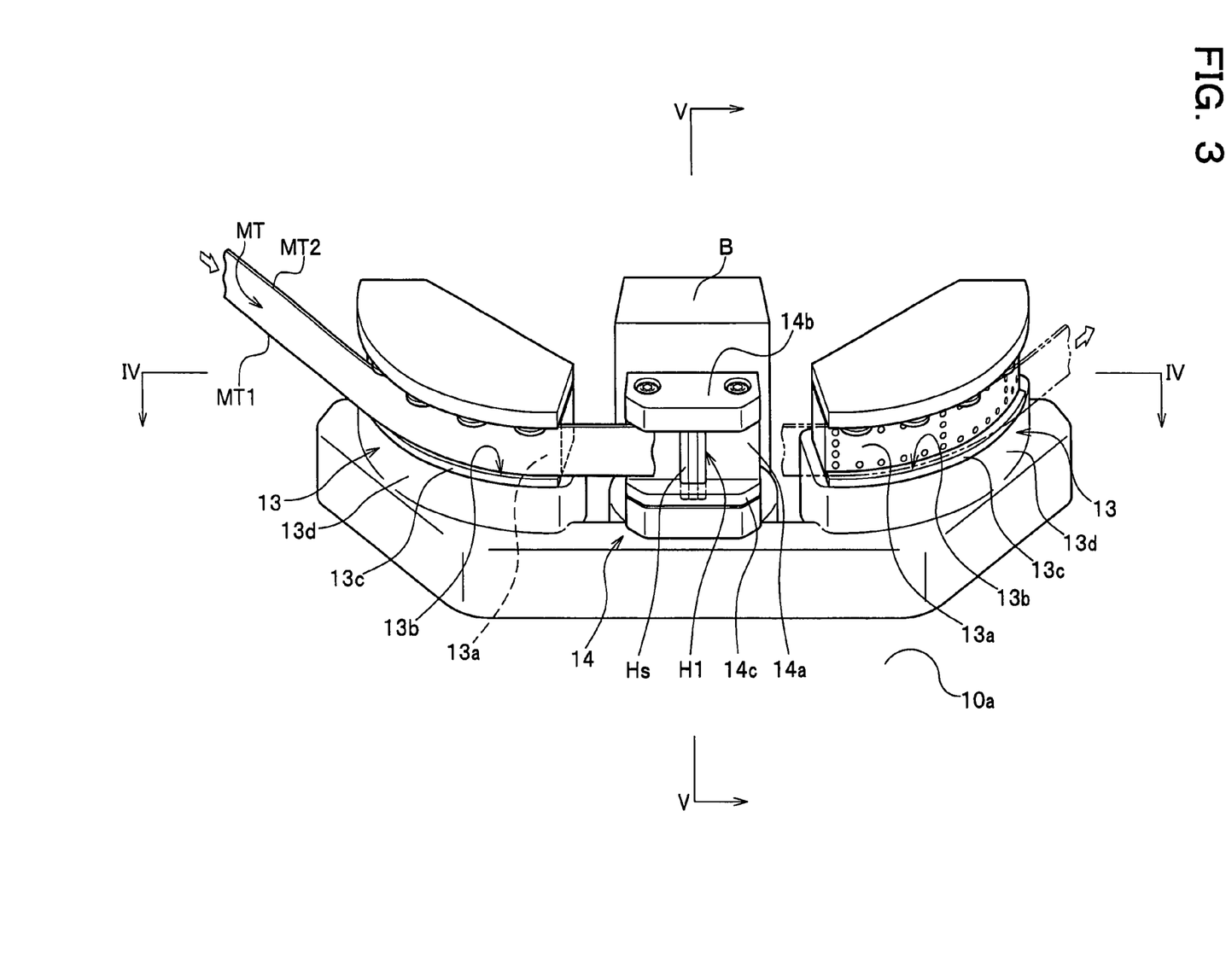
FIG. 3 is a perspective view showing a writing head and guides.

FIG. 3 is a perspective view showing a writing head and guides. As shown in FIG. 3, the guides 13, 13 are fixed to a reference side 10a (hereinafter, referred to as panel side) of the servo writer 10. Guiding surfaces 13a of the guides 13, 13 for the magnetic tape MT are formed in a circular arc for smoothly sliding a recording surface/reproducing surface of the magnetic tape MT. At edges of the guides 13, 13 on the panel side 10a, flanges 13d are formed along a running direction of the magnetic tape. At end faces of the flanges 13d on a human side (opposite side of the panel side), resin contacting elements 13c are fixed, and they form edge guiding surfaces 13b for guiding a panel side edge (reference edge) MTI of the magnetic tape MT. On the operator side of each guide 13, an elastic material (not shown) is attached for preventing the magnetic tape MT from being damaged.

In a place between the guides 13, 13, a head block 14 is arranged, which is fixed to the panel side 10a through a base member B. The head block 14 is a member for holding the writing head H1, and a cross section of the head block 14 is formed in, for example, a "]" shape with a base member 14a perpendicular to the panel side 10a and holding members 14b, 14c extending along a running direction of the magnetic tape from edges of the base member 14a (refer to FIG. 5).

Figure 4:
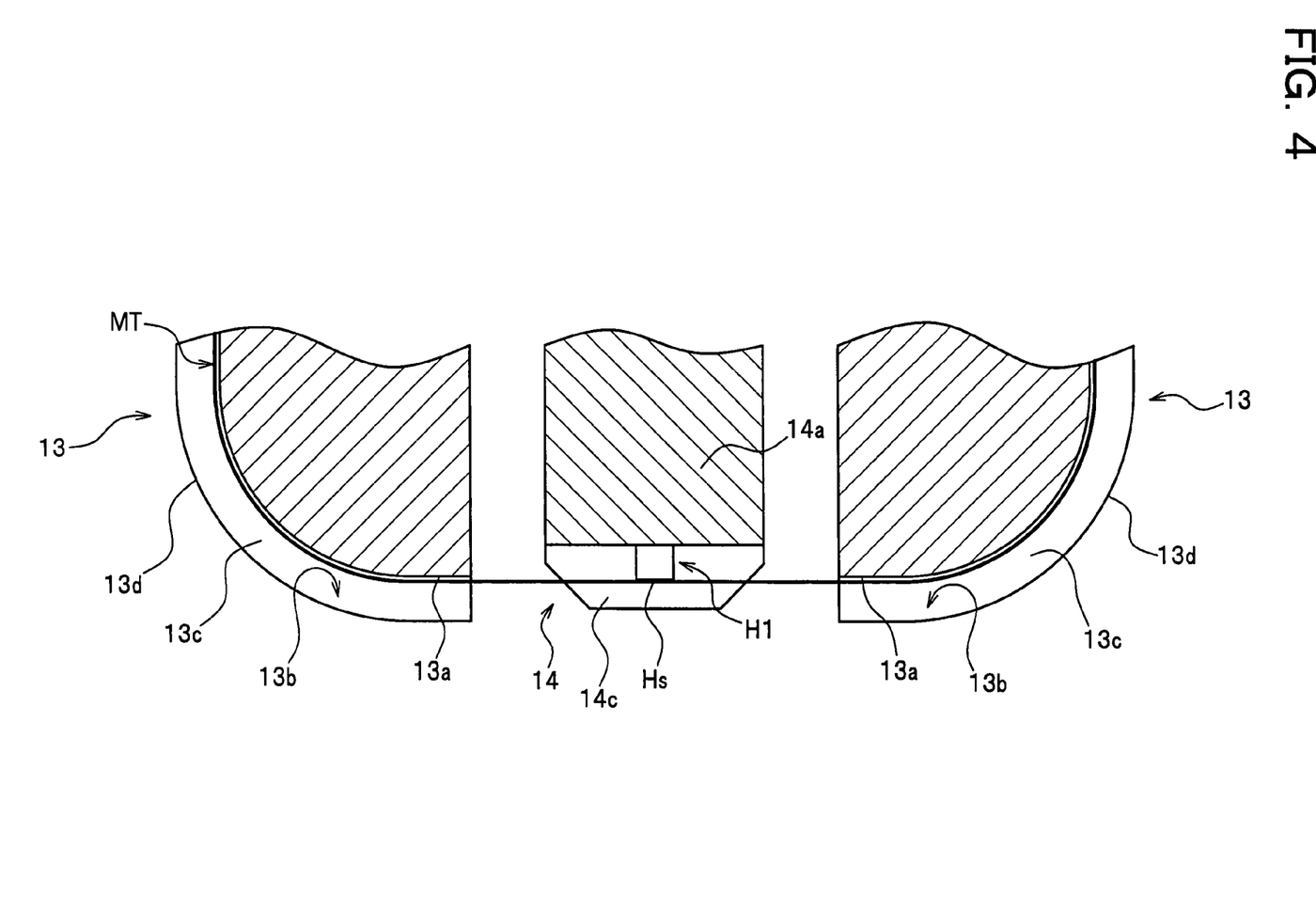
FIG. 4 is a cross sectional view cut along a IV-IV line in FIG. 3.

FIG. 4 is a cross sectional view cut along a IV-IV line in FIG. 3. As shown in FIG. 4, the base member 14a of the head block 14 is arranged apart from a running position of the magnetic tape MT farther than that of the guiding surfaces 13a of the guides 13. In addition, at a center of the base member 14a, the writing head H1 is arranged closer to the running position of the magnetic tape MT than the guiding surfaces 13a, 13a, such that the writing head H1 hits against the running position.

The writing head H1 includes a coil (not shown) which is wound on a head core, and provided with a magnetic gap having a predetermined pattern on a sliding surface Hs. The writing head H1 is supplied with a pulse current for servo signal recording through, for example, a conductive wire by a servo signal supplying circuit (not shown), magnetizes the magnetic layer 82 of the magnetic tape MT by a magnetic leakage flux from the magnetic gap, and writes a servo signal for controlling a position of a magnetic head of a record reproduction apparatus. Meanwhile, the servo signal is written in a servo band (not shown) which is disposed along a longitudinal direction of the magnetic tape MT.

Figure 5:
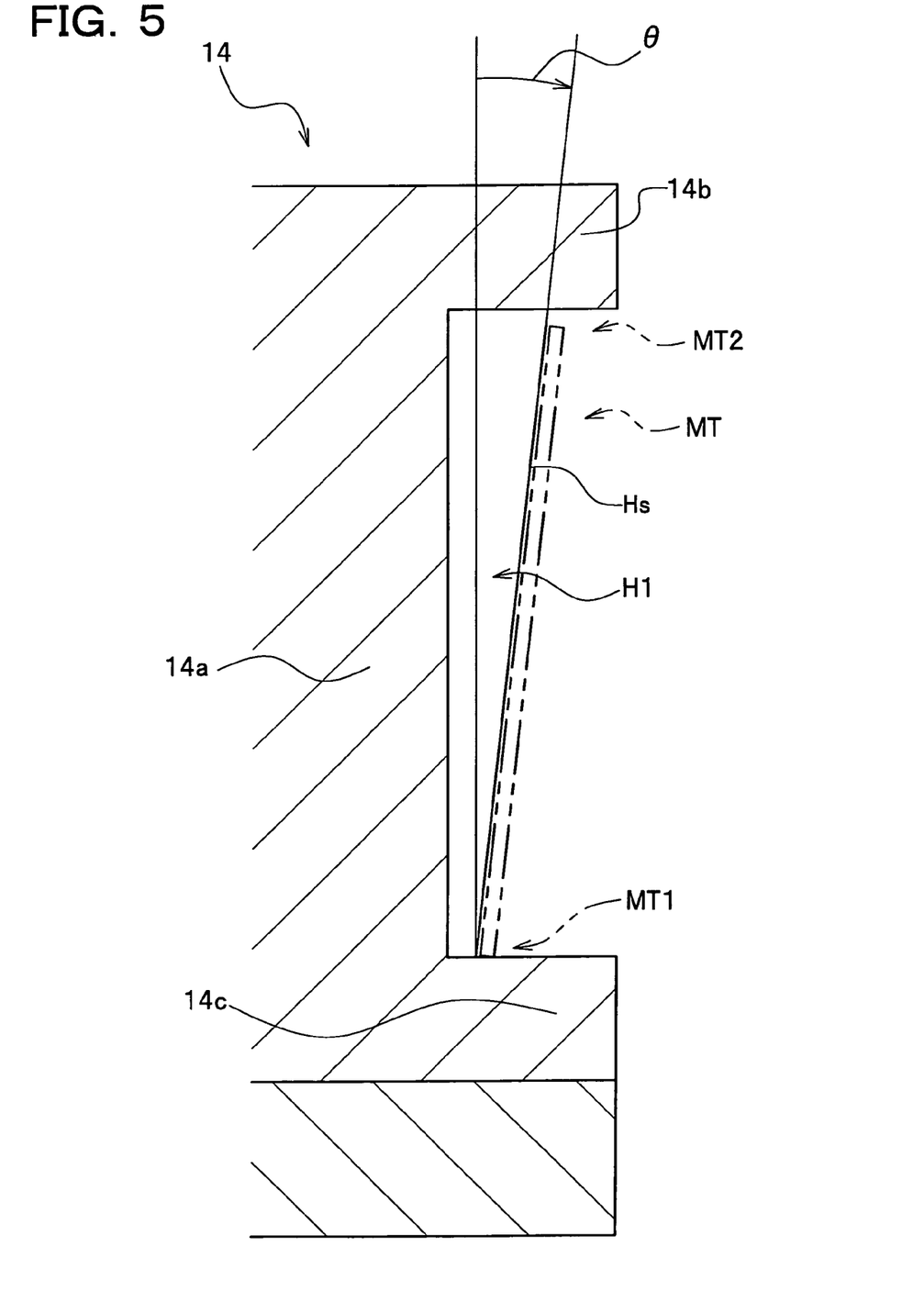
FIG. 5 is a cross sectional view cut along a V-V line in FIG. 3.

FIG. 5 is a cross sectional view cut along a V-V line in FIG. 3. As shown in FIG. 5, the writing head H1 is arranged with an inclination so that the sliding surface Hs and base member 14a make a predetermined angle θ (tilt angle). The base member 14a is arranged in parallel with a path where the magnetic tape MT, which is guided by the guiding surfaces 13a, 13a, is supposed to run originally. In other words, the writing head H1 is fixed to the head block 14 with an inclination against a tape width direction of a running magnetic tape MT. With the above arrangement, the magnetic tape MT runs shifted to a side of the edge MT1 (panel side 10a) so that the magnetic tape MT runs a shortest distance, thereby the edge MT1 runs sliding in contact with the edge guiding surfaces 13b of the guides 13. Meanwhile, it is preferable that the angle θ is not more than 1 (one) degree. If the angle θ is larger than 1 (one) degree, because the edge MT1 is strongly worn with the edge guiding surfaces 13b, problems tend to take place. For example, wrinkles may be made on a surface of the magnetic tape MT, and a foreign object may be stick between the wrinkles.

<Operation of Servo Writer>

Next, operations of the servo writer 10 according to the embodiment will be explained. First, as shown in FIG. 2, the magnetic tape MT, which is in a condition before writing a servo signal and has a pancake-shape, is set on the feeding reel 11 (refer to FIG. 3) so that the edge MT1 and edge MT2 are positioned on the panel side 10a and human side, respectively. Subsequently, the magnetic tape MT is set on the guide rollers R, guide 13, writing head H1, guide 13, and guide rollers R, and bound to the winding reel 12. Then, by driving the feeding reel 11 and winding reel 12 with a driving unit (not shown), the magnetic tape MT is run.

In the writing head H1, the magnetic tape MT of which running direction is guided by the guides 13, 13 slides in contact with the sliding surface Hs, and it is written a servo signal in a servo band (not shown) of the magnetic tape MT. In this case, as shown in FIG. 4, since the writing head H1 is set closer to the running position of the magnetic tape MT than the guiding surfaces 13a, 13a, such that the writing head H1 hits against the running position, and also since the sliding surface Hs is set with an inclination, the magnetic tape MT runs shifted to a side of the edge MT1 (panel side 10a). Then, as shown in FIG. 3, the edge MT1 slides in contact with the edge guiding surfaces 13b. Accordingly, a positional variation of the magnetic tape MT in the tape width direction is suppressed, thereby resulting in an accurate writing of the servo signal in the magnetic tape MT.

In addition, since the present invention is different from the conventional technology, in which a positional variation of the magnetic tape MT in the tape width direction is suppressed by holding both edges MT1, MT2, the edge damages can be prevented even if the magnetic tape MT is thin. Meanwhile, if the edge MT2 of a thin magnetic tape MT slides in contact with the edge guiding surfaces 13b, damages of the edge MT2 may be produced due to grinding and crashing of the projected magnetic layer 82 (refer to FIG. 1). However, in the present embodiment, since the edge MT1, in which a strong support 81 is projected, is slid in contact with the edge guiding surfaces 13b, the damages can be suppressed in minimum.

A servo signal was written on a sample magnetic tape (6.6 μm in thickness) by the servo writer 10 which had a writing head H1 according to the embodiment, and PES (Position Error Signal) was measured. The PES is a calculation result of a relative distance between a magnetic tape and a magnetic head. It is obtained through the following processes. In operations of tracking servo in which a magnetic head traces a servo signal, a position of the servo signal is detected based on a signal which is read by a reading element from the servo signal. Then, the PES is calculated using the detected position of the servo signal. The PES means that the smaller the PES value, the magnetic head traces the servo signal better.

Figure 6A:
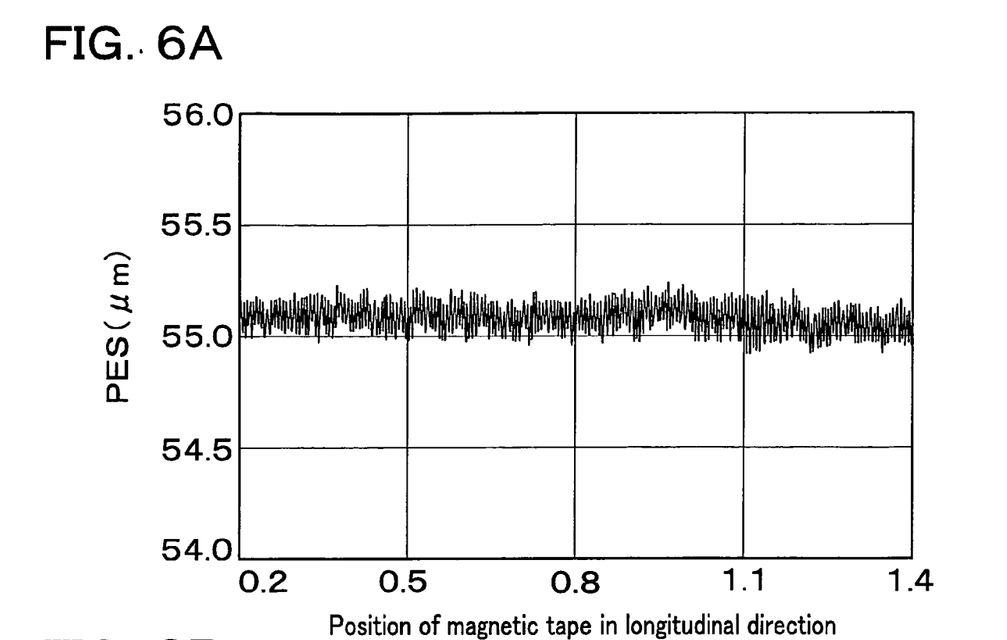
FIG. 6A is a figure showing a value of PES, in which a servo signal is written by a writing head with a predetermined tilt angle, with respect to a longitudinal position of a magnetic tape.
Figure 6B:
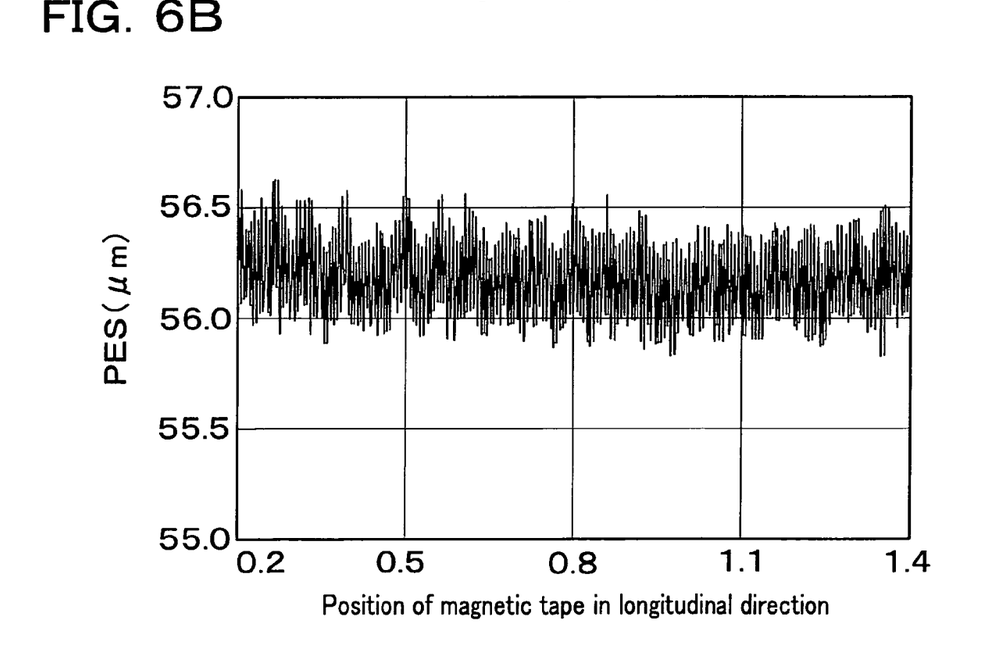
FIG. 6B is a figure showing a value of PES, in which a servo signal is written by a writing head without a tilt (with zero tilt angle), with respect to a longitudinal position of a magnetic tape.

FIG. 6A is a figure showing a value of PES, in which a servo signal is written by a writing head with a predetermined tilt angle, with respect to a longitudinal position of a magnetic tape. FIG. 6B is a figure showing a value of PES, on which a servo signal is written by a writing head without a tilt (with zero tilt angle), with respect to a longitudinal position of a magnetic tape. As shown in FIG. 6A, when a servo signal is written by a writing head with a predetermined tilt angle (one "1" degree), the PES of approximately 0.1 µm in amplitude was measured. On the other hand, as shown in FIG. 6B, when a servo signal is written by a writing head without a tilt (zero "0" degree), the PES of approximately 0.2 µm in amplitude was measured. With the above, it has been found that the PES, that is, a tracing capability of the magnetic head is improved when a servo signal is written by a writing head with a tilt angle (in the case of FIG. 6A), rather than without a tilt.

According to the above, the following advantages can be obtained in the embodiment.

Since the edge MT1 runs shifted to the panel side 10a, while sliding in contact with the edge guiding surfaces 13b, by making a tension on the edge MT2 side of the magnetic tape MT high in the writing head H1, a positional variation of the magnetic tape MT in tape width direction can be suppressed. Through this, a servo signal can be written with a high accuracy, and the PES can be improved.

In addition, since the edge MT1, in which a strong support 81 is projected, slides in contact with the edge guiding surfaces 13b, edge damages can be suppressed to the minimum. If the edge damages are produced, a sliding condition of the edge MT1 against the edge guiding surfaces 13b becomes wrong, thereby resulting in a large positional variation of the magnetic tape in the tape width direction. However, in the embodiment, since the edge damages are suppressed, the positional variation in the tape width direction caused by the edge damages can be suppressed.

The embodiment of the present invention has been explained. However, the present invention is not limited to the aforementioned embodiment, but can be embodied in various modifications.

In the aforementioned embodiment, the edge MT1 of the magnetic tape MT is configured to slide in contact with the edge guiding surfaces 13b of the flange 13d of the guides 13. However, the present invention is not limited to this. The edge MT1 may be slid in contact with a flange which is disposed on the head block of the writing head H1.

In the aforementioned embodiment, a case where a servo signal is written by a wring head has been explained. The servo signal may be written after a servo band is DC magnetized in one direction before writing the servo signal so that the servo signal is written in the opposite direction of the servo band with respect to the magnetic direction. Through this, an amount of magnetization change in reading the servo signal can be increased, thereby resulting in increase of the servo signal.

In the aforementioned embodiment, the writing head H1 has been explained. However, the verifying head H2 may be configured in a similar manner to the writing head H1.

In addition, in the aforementioned embodiment, the magnetic tape MT has been explained. However, a tape memory medium such as an optical memory medium and the like also may be used.

What is claimed is:

1. A servo writer for writing a servo signal in a running tape memory medium, comprising:
    a head which is arranged in a vicinity of a running path of the running tape memory medium; and
    a pair of guides which are disposed adjacent to the head in an upstream and downstream of the head in a tape running direction,
    wherein at least one of the head and pair of guides has a flange with which one edge the tape memory medium set in the running path runs is in contact, while the tape memory medium is running between the pair of guides, wherein the head has a sliding surface which slides in contact with a recording surface of the running tape memory medium,
    wherein the sliding surface is set with a rigidly fixed inclination against a tape width direction of the tape memory medium, the angle of inclination being non-moving, and having a value other than zero degrees, and the tape memory medium, which is running, is guided by the flange by having the one edge of the tape memory medium constantly maintain in sliding contact with the flange.

2. The servo writer according to claim 1,
    wherein the inclination of the sliding surface against the tape width direction is not more than than 1 (one) degree.

3. The servo writer according to claim 1,
    wherein the head comprises a writing head for writing a servo signal in the running tape memory medium.

4. A servo signal writing method, comprising steps of:
    a step for preparing a servo writer according to claim 3;
    a step for setting a tape memory medium on the servo writer; and
    a step for writing a servo signal in the tape memory medium by the writing head, by running and sliding the tape memory medium in contact with the sliding surface of the writing head, while sliding the one edge of the tape memory medium in contact with the flange.

5. The servo signal writing method according to claim 4,
    wherein in the step for setting the tape memory medium, when a magnetic tape runs, which comprises a support and a magnetic layer formed on the support and has a first edge where the support is projected to an end face of the magnetic tape more than the magnetic layer, the first edge slides in contact with the flange.

6. The servo signal writing method according to claim 4,
    wherein the step for writing a servo signal comprises:
    a step for DC magnetizing a servo band in an upstream of the writing head in the tape running direction so that a magnetic direction is oriented to one direction; and
    a step for writing a servo signal in an opposite direction of the one direction.

7. The servo writer according to claim 1,
    wherein the head comprises a verifying head for verifying a servo signal written on the running tape memory medium.

8. A servo signal verifying method, comprising steps of:
    a step for preparing a servo writer according to claim 7;
    a step for setting a tape memory medium on the servo writer; and
    a step for verifying a servo signal written on the tape memory medium by the verifying head, by having the tape memory medium run in contact with the sliding surface of the verifying head, while sliding the one edge of the tape memory medium in contact with the flange.

9. The servo signal verifying method according to claim 8, wherein in the step for setting the tape memory medium, when having a magnetic tape run, which comprises a support and a magnetic layer formed on the support and has a first edge where the support is projected to an end face of the magnetic tape more than the magnetic layer, the first edge slides in contact with the flange.

10. The servo writer according to claim 1,
wherein the tape memory medium comprises one of a magnetic tape and an optical memory medium.

11. The servo writer according to claim 1, wherein the inclination of the sliding surface is fixed.

12. The servo writer according to claim 11, wherein the sliding surface is fixed directly to a head block.

13. The servo writer according to claim 11, wherein the sliding surface is inclined with respect to a base member of a head block.

* * * * *